United States Patent
Hayes et al.

(10) Patent No.: US 12,434,677 B2
(45) Date of Patent: Oct. 7, 2025

(54) REDUNDANT PARKING BRAKE APPARATUS FOR A VEHICLE AND METHOD OF OPERATING THE SAME

(71) Applicant: BENDIX COMMERCIAL VEHICLE SYSTEMS LLC, Avon, OH (US)

(72) Inventors: Thomas J. Hayes, Lakewood, OH (US); Jeswanth Samayamantula, Avon Lake, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 167 days.

(21) Appl. No.: 18/239,331

(22) Filed: Aug. 29, 2023

(65) Prior Publication Data

US 2025/0074373 A1    Mar. 6, 2025

(51) Int. Cl.
| | |
|---|---|
| *B60T 8/92* | (2006.01) |
| *B60Q 9/00* | (2006.01) |
| *B60T 13/38* | (2006.01) |
| *B60T 13/68* | (2006.01) |
| *B60T 17/22* | (2006.01) |

(52) U.S. Cl.
CPC ............. *B60T 8/92* (2013.01); *B60Q 9/00* (2013.01); *B60T 13/385* (2013.01); *B60T 13/683* (2013.01); *B60T 17/22* (2013.01)

(58) Field of Classification Search
CPC ........ B60T 8/92; B60T 13/385; B60T 13/665; B60T 13/683; B60T 15/041; B60T 17/22; B60T 2270/40; B60T 2270/402; B60T 2270/403; B60T 2270/404
USPC .................................................... 701/70, 76
See application file for complete search history.

(56) References Cited

U.S. PATENT DOCUMENTS

| | | |
|---|---|---|
| 6,969,127 B2 | 11/2005 | Suzuki et al. |
| 10,875,511 B2 | 12/2020 | Vandenberg et al. |
| 11,390,260 B2 | 7/2022 | Barade et al. |
| 11,407,394 B2 | 8/2022 | Hutchins et al. |
| 2020/0023823 A1 | 1/2020 | Baehrle-Miller et al. |
| 2020/0180586 A1* | 6/2020 | Taneyhill ............... B60T 17/12 |
| 2020/0406869 A1 | 12/2020 | Hwang |

(Continued)

OTHER PUBLICATIONS

International Search Report of counterpart PCT/US2024/042077, mailed Dec. 9, 2024, 5 pages.

(Continued)

*Primary Examiner* — Erick R Solis
(74) *Attorney, Agent, or Firm* — Geoffrey A. Kudlo; Brian E. Kondas; Cheryl L. Greenly (57) ABSTRACT

A redundant parking brake apparatus is provided for a vehicle having components of a parking brake system. The redundant parking brake apparatus comprises a first parking brake controller arranged to (i) monitor a first signal indicative of a request to apply parking brakes of the vehicle, and (ii) provide one or more control signals to be applied to components of the parking brake system to apply the parking brakes in response to receiving the first signal. The redundant parking brake apparatus also comprises a second parking brake controller arranged to (i) initiate a timer counter in response to receiving the first signal, and (ii) provide one or more control signals to be applied to components of the parking brake system to apply the parking brakes when the timer counter has reached a predetermined count.

19 Claims, 5 Drawing Sheets

(56) References Cited

U.S. PATENT DOCUMENTS

| | | |
|---|---|---|
| 2021/0155217 A1 | 5/2021 | Hayes et al. |
| 2021/0170999 A1* | 6/2021 | Hutchins .................. B60T 7/12 |
| 2021/0277995 A1* | 9/2021 | Hutchins ................ B60T 7/122 |
| 2022/0161809 A1 | 5/2022 | Belling et al. |
| 2022/0169249 A1* | 6/2022 | Gaughan ................ B60T 17/22 |
| 2023/0126121 A1 | 4/2023 | Brenn et al. |
| 2024/0092323 A1* | 3/2024 | Reifman .................. B60T 7/12 |

OTHER PUBLICATIONS

Written Opinion of counterpart PCT/US2024/042077, mailed Dec. 9, 2024, 9 pages.

* cited by examiner

REDUNDANT PARKING BRAKE APPARATUS FOR A VEHICLE AND METHOD OF OPERATING THE SAME

BACKGROUND

The present application relates to vehicle parking systems, and is particularly directed to a redundant parking brake apparatus for a vehicle and method of operating the same, such as for a parking system of an autonomously-driven vehicle (e.g., an autonomously-driven truck).

Vehicle parking systems for trucks are known. One type of vehicle parking system for trucks includes a primary parking brake system and a secondary parking brake system that acts a backup to the primary parking brake system when parking brakes are not applied in response to the primary parking brake system.

Despite advancements already made, those skilled in the art continue with research and development efforts in the field of vehicle parking systems that have primary and secondary parking brake systems, such as those used in trucks.

SUMMARY

In accordance with one embodiment, a redundant parking brake apparatus is provided for a vehicle having components of a parking brake system. The redundant parking brake apparatus comprises a first parking brake controller arranged to (i) monitor a first signal indicative of a request to apply parking brakes of the vehicle, and (ii) provide one or more control signals to be applied to components of the parking brake system to apply the parking brakes in response to receiving the first signal. The redundant parking brake apparatus also comprises a second parking brake controller arranged to (i) initiate a timer counter in response to receiving the first signal, and (ii) provide one or more control signals to be applied to components of the parking brake system to apply the parking brakes when the timer counter has reached a predetermined count.

In accordance with another embodiment, a redundant parking brake apparatus is provided for a vehicle having parking brakes and a timer counter. The redundant parking brake apparatus comprises means for, when a request signal to apply the parking brakes is received, applying the parking brakes. The redundant parking brake apparatus also comprises means for, when a predetermined count of the timer counter is reached, applying the parking brakes independently of whether or not the parking brakes have been applied in response to receiving the request signal to apply the parking brakes.

In accordance with yet another embodiment, a method is provided of operating a redundant parking brake apparatus for a vehicle. The method comprises monitoring a request signal to apply parking brakes of the vehicle. The method also comprises initiating a timer counter in response to receiving the request signal. The method further comprises providing one or more control signals to apply the parking brakes when the timer counter reaches a predetermined count.

DETAILED DESCRIPTION

The present application is directed to a redundant parking brake apparatus for a vehicle such as autonomously-driven commercial truck. The specific construction of the redundant parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
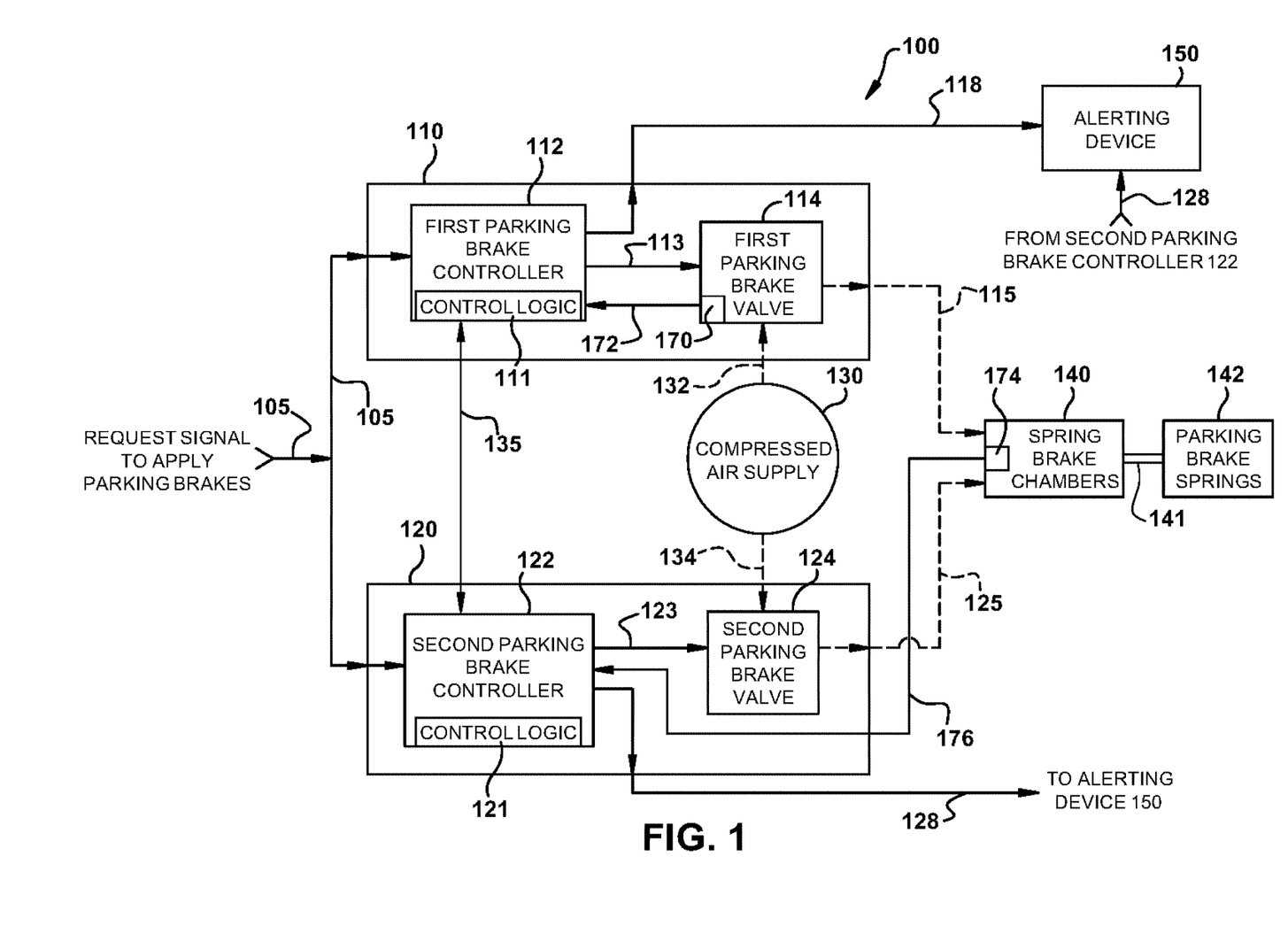
FIG. 1 is a schematic block diagram showing an example redundant parking brake apparatus constructed in accordance with an embodiment.

Referring to FIG. 1, a schematic block diagram showing an example redundant parking brake apparatus 100 constructed in accordance with an embodiment is illustrated. In FIG. 1, electrical line connections are shown as solid lines, pneumatic lines connections are shown as dashed lines, and mechanical couplings are shown as double solid lines.

Redundant parking brake apparatus 100 comprises a first electronic parking brake system 110 that includes at least in part a first parking brake controller 112 and a first parking brake valve 114 operatively coupled via line 113 to the first parking brake controller 112. The redundant parking brake apparatus 100 also comprises a second electronic parking brake system 120 that includes at least in part a second parking brake controller 122 and a second parking brake valve 124 operatively coupled via line 123 to the second parking brake controller 122.

The first parking brake valve 114 is responsive to an input signal on line 113 from the first parking brake controller 112 to provide an output signal on line 115 to spring brake chambers 140 of the vehicle. The second parking brake value 124 is responsive to an input signal on line 123 from the second parking brake controller 122 to provide an output signal on line 125 to the spring brake chambers 140. The spring brake chambers 140 are mechanically coupled via line 141 to parking brake springs 142 of the vehicle.

A compressed air supply 130 provides compressed air to each of the first and second parking brake valves 114, 124 via lines 132, 134, respectively, to enable operation thereof. Even though one compressor 130 is shown in FIG. 1, it is conceivable that two compressors, one associated with each parking brake value, be used. Structure and operation of parking brake valves 114, 124 for controlling operation of spring brake chambers 140 and parking brake springs 142 to apply and release parking brakes of the vehicle are conventional and, therefore, will not be further described.

An alerting device 150 is coupled via line 118 to the first parking brake controller 112 and is located in a passenger compartment (not shown) of the vehicle. The alerting device 150 is also coupled via line 128 to the second parking brake controller 122. The alerting device 150 may comprise any number of devices that can provide any combination of signals including a visual signal, an audio signal, and a haptic signal to alert a person in the vehicle passenger compartment with a message. Other devices that provide different types of signals to alert a person in the vehicle passenger compartment are possible.

A communication link (e.g., a controller area network (CAN) bus) on line 135 between the first and second parking brake controllers 112, 122 supports signaling between the controllers 112, 122. As an example, the communication link on line 135 may be in a standardized serial communication format, such as SAE J1939, or in a proprietary format. It is conceivable that the controllers 112, 122 may be hardwired for communication instead of using a CAN bus.

A first pressure sensor 170 is located within the first parking brake valve 114, and a second pressure sensor 174 is located between the first parking brake valve 114 and the spring brake chambers 140. The first pressure sensor 170 provides a signal on line 172 indicative of brake pressure in a valve chamber of the first parking brake valve 114, for example. The second pressure sensor 174 provides a signal on line 176 indicative of brake pressure in a brake line (e.g., in line 115) that extends between the first parking brake valve 114 and the spring brake chambers 140. The spring brake chambers 140 have an internal connection that enables the second pressure sensor 174 to not only measure the pressure in line 115 but to also measure the pressure in line 125.

In FIG. 1, the two pressure sensors 170, 174 are shown used in a vehicle such as a tractor (i.e., a truck or towing vehicle). If the tractor were to be towing a trailer, then additional pressure sensors would be needed for a vehicle that comprises a tractor-trailer. Also, the two pressure sensors 170, 174 are shown in FIG. 1 as separate sensors. However, it is conceivable that the two pressure sensors 170, 174 comprise a single-integrated pressure sensor.

In accordance with an aspect of the present disclosure, control logic 111 associated with the first parking brake controller 112 and control logic 121 associated with the second parking brake controller 122 cooperate together to provide a redundant parking brake system. The first and second parking brake controllers 112, 122 generate one or more control signals that are applied to parking brake components, including the first and second parking brake valves 114, 124, to apply parking brakes of the vehicle in response to receiving a request signal (i.e., a first signal) on line 105 to apply the parking brakes. The first and second parking brake controllers 112, 122 may also generate one or more control signals that are applied to parking brake components, including the first and second parking brake valves 114, 124, to release the parking brakes of the vehicle in response to receiving a request signal (i.e., a first signal) on line 105 to release the parking brakes. The request signal on line 105 may be provided by a virtual-driver controller, for example. The request signal on line 105 may be provided by other sources.

Notably, the second parking brake controller 122 is arranged with its control logic 121 to initiate a timer counter in response to receiving the request signal on line 105 to apply the parking brakes, and then to provide one or more control signals on line 123 to be applied to the second parking brake valve 124 to apply the parking brakes when the timer counter has reached a predetermined count. As an example, the predetermined count may be between a count of about one second and about five seconds. Specifics of the predetermined count vary based upon configuration of the particular vehicle.

In accordance with another aspect of the present disclosure, control logic 121 associated with the second parking brake controller 122 enables the second parking brake controller 122 to monitor a brake pressure signal (i.e., a second signal) that is indicative of whether the parking brakes of the vehicle are being applied in response to the request signal (i.e., the first signal). The second parking brake controller 122 then provides one or more control signals on line 123 to be applied to the second parking brake valve 124 to apply the parking brakes when the second signal indicates that the parking brakes are not being applied in response to the first signal.

In some embodiments, the second signal is provided by the second pressure sensor 174 located between the first parking brake valve 114 and the spring brake chambers 140.

In some embodiments, the second signal is provided by one or more inter-controller signals on line 135 from the first parking brake controller 112. In this case, control logic 111 associated with the first parking brake controller 112 enables the first parking brake controller 112 to monitor the brake pressure signal (i.e., a third signal) that is from the first pressure sensor 170 located within the first parking brake valve 114. The third signal is indicative of whether the parking brakes of the vehicle are being applied in response to the request signal (i.e., the first signal) on line 105. The first parking brake controller 112 then provides the one or more inter-controller signals on line 135 (i.e., the second signal) to the second parking brake controller 122.

An example operation of the redundant parking brake apparatus 100 of FIG. 1 when a request signal is received on line 105 to apply the parking brakes is described herein. In response to receiving the request signal on line 105, the first parking brake controller 112 provides one or more signals on line 113 to control operation of the first parking brake valves 114. Compressed air supply 130 provides a source of compressed air in line 132 to the first parking brake valve 114. The first parking brake valve 114 is controlled by the first parking brake controller 112 to vary pneumatic pressure in line 115 to one or more chambers of spring brake chambers 140.

More specifically, the first parking brake controller 112 provides signals on line 113 that are applied to the first parking brake valve 114 so as to exhaust air in one or more chambers of spring brake chambers 140. When air in the spring brake chambers 140 is exhausted and system air pressure drops to less than about 45 psi to 60 psi, the parking brake springs 142 are activated to apply the parking brakes.

The second parking brake controller 122 receives the request signal on line 105 at the same time the first parking brake controller 112 receives the request signal on line 105. In response to receiving the request signal on line 105, the second parking brake controller 122 initiates a timer counter that is embedded in the control logic 121 of the second parking brake controller 122 to begin counting.

When the timer counter reaches a predetermined count (e.g., two seconds), the second parking brake controller 122 provides one or more signals on line 123 to control operation of the second parking brake valves 124. The compressed air supply 130 provides a source of compressed air in line 134 to the second parking brake valve 124. The second parking brake valve 124 is controlled by the second parking brake controller 122 to vary pneumatic pressure in line 125 to one or more chambers of spring brake chambers 140.

More specifically, the second parking brake controller 122 provides signals on line 123 that are applied to the second parking brake valve 124 so as to exhaust air in one or more chambers of spring brake chambers 140. When air in the spring brake chambers 140 is exhausted and system air pressure drops to less than about 45 psi to 60 psi, the parking brake springs 142 are activated to apply the parking brakes.

The first and second parking brake controllers 112, 122 cooperate together to provide redundant parking brake action. The redundant parking action is provided by the second electronic parking brake system 120. The redundant parking brake system 120 ensures that the request signal on line 105 is honored in time, even though there is no fault in the primary parking brake system (i.e., the first electronic parking brake system 110 including the first parking brake controller 112 and the first parking brake valve 114).

In particular, the timer counter that is embedded in the control logic 121 of the second parking brake controller 122 is configured such that the second parking brake controller 122 takes an appropriate action to honor (or reject as the case may be) the parking request (i.e., the request signal on line 105) even when the primary parking brake action taken by the first parking brake controller 112 is working as expected.

Figure 1A:
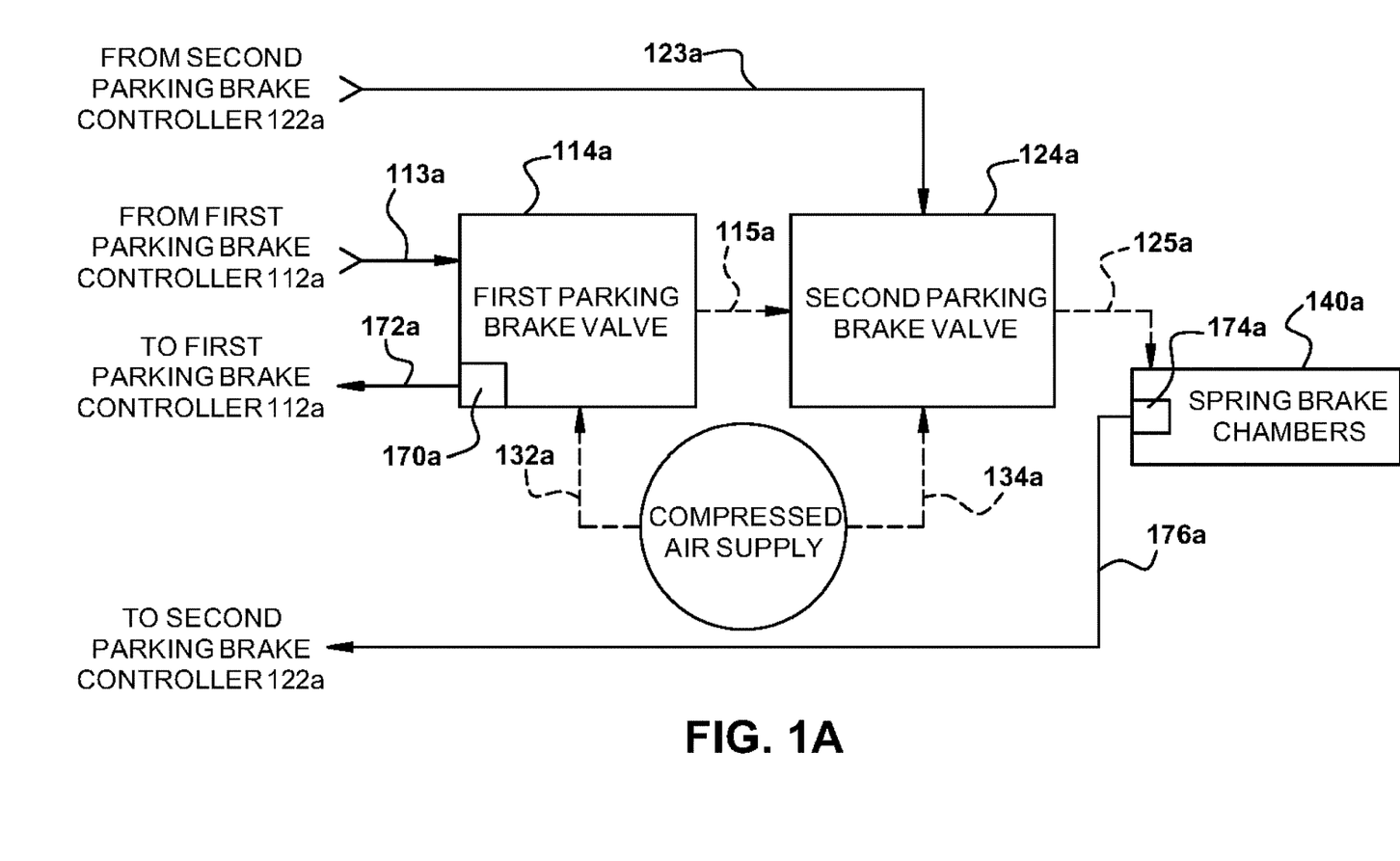
FIGS. 1A and 1B are schematic block diagrams showing examples of redundant parking brake apparatuses constructed in accordance with other embodiments.

It should be apparent that the first and second parking brake valves 114, 124 are arranged in a parallel configuration relative to the spring brake chambers 140 of the vehicle. It is conceivable that the first and second parking brake valves 114, 124 shown in FIG. 1 be arranged in a series configuration relative to the spring brake chambers 140 of the vehicle, such as shown in the embodiment of FIG. 1A and the embodiment of FIG. 1B. Reference numerals used in the embodiment of FIG. 1A correspond to reference numerals used in the embodiment of FIG. 1, with a suffix "a" added in FIG. 1A to avoid confusion. Similarly, reference numerals used in the embodiment of FIG. 1B correspond to reference numerals used in the embodiment of FIG. 1, with a suffix "b" added in FIG. 1B to avoid confusion.

Referring to FIG. 1A, first parking brake valve 114a is connected via line 113a to first parking brake controller 112a, and second parking brake valve 124a is connected via line 123a to second parking brake controller 122a. First pressure sensor 170a is connected via line 172a to first parking brake controller 112a. First parking brake valve 114a is connected via line 115a to second parking brake valve 124a. Second parking brake valve 124a is connected via line 125a through second pressure sensor 174a to spring brake chambers 140a.

Second pressure sensor 174a is connected via line 176a to second parking brake controller 122a. Compressed air supply 130a provides compressed air to each of the first and second parking brake valves 114a, 124a via lines 132a, 134a, respectively, to enable operation thereof. If one of the first and second parking brake valves 114a, 124a were to fail, the parking brakes would still be able to be controlled. As shown in FIG. 1A, first and second parking brake valves 114a, 124a are arranged in a series configuration relative to spring brake chambers 140a of the vehicle.

Figure 1B:
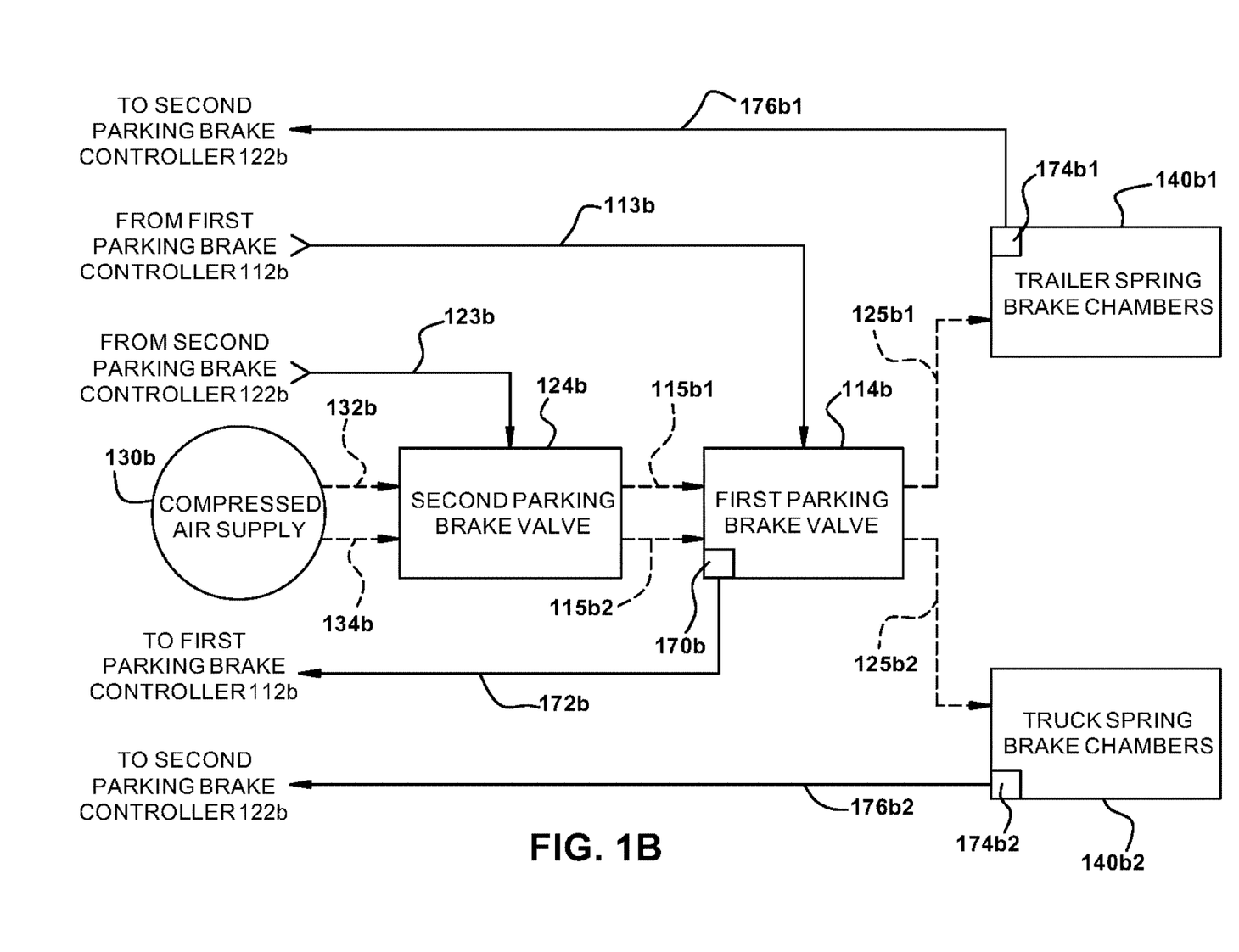

Referring to FIG. 1B, first parking brake valve 114b is connected via line 113b to first parking brake controller 112b, and second parking brake valve 124b is connected via line 123b to second parking brake controller 122b. First pressure sensor 170b is connected via line 172b to first parking brake controller 112b. Second parking brake valve 124b is connected via line 115b1 and line 115b2 to first parking brake valve 114b. First parking brake valve 114b is connected via line 125b1 through second pressure sensor 174b1 to trailer spring brake chambers 140b1, and via line 125b2 through third pressure sensor 174b2 to truck spring chambers 140b2.

Second pressure sensor 174b1 is connected via line 176b1 to second parking brake controller 122b. Third pressure sensor 174b2 is connected via line 176b2 to second parking brake controller 122b. Compressed air supply 130b provides compressed air via line 132b and line 134a to second parking valve 124b to enable operation thereof. If one of the first and second parking brake valves 114b, 124b were to fail, the parking brakes would still be able to be controlled. As shown in FIG. 1B, first and second parking brake valves 114b, 124b are arranged in a series configuration relative to trailer spring brake chambers 140b1 and truck spring brake chambers 140b2 of the vehicle.

Figure 2:
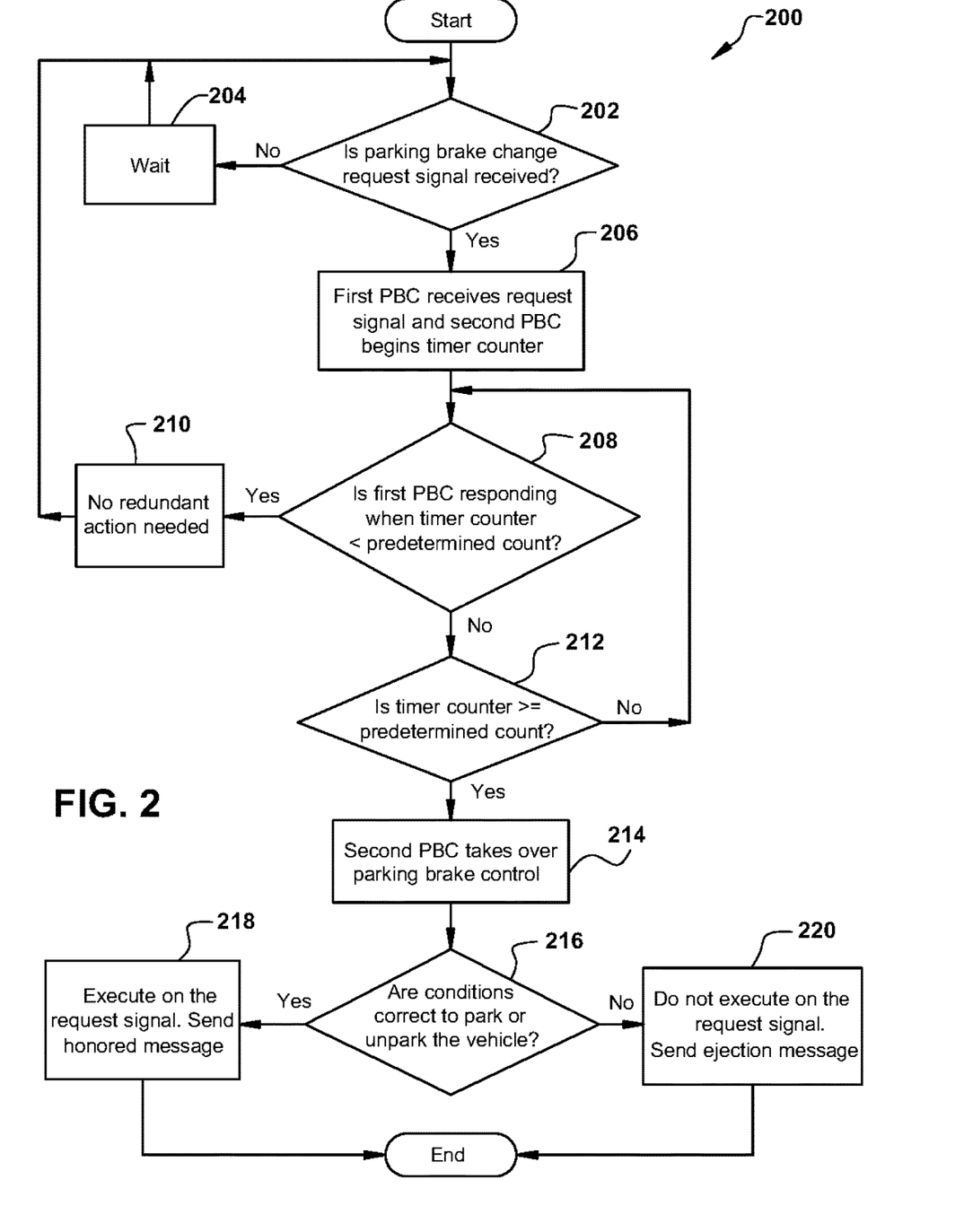
FIG. 2 is a flow diagram depicting an example method of operating the redundant parking brake apparatus of FIG. 1 in accordance with an embodiment.

Referring to FIG. 2, a flow diagram 200 depicts an example method of operating the redundant parking brake apparatus 100 of FIG. 1 in accordance with an embodiment. The flow diagram 200 is an embodiment of the control logic 121 shown in FIG. 1, and will be referred to herein as "control logic 121".

After a system initialization, the control logic 121 begins in block 202 by making a determination as to whether a parking brake change request signal (referred to herein as "request signal") on line 105 is received. A request signal is a command to either park the vehicle or unpark the vehicle. As previously mentioned, the request signal on line 105 may originate from a virtual-driven controller. If the determination in block 202 is negative (i.e., no request signal on line 105 is received), the process proceeds to block 204 to wait and return back to block 202 to continue monitoring for a request signal on line 105.

However, if the determination in block 202 is affirmative (i.e., a request signal on line 105 is received), the process proceeds to block 206. In block 206, the first parking brake controller 112 (first PBC) receives the request signal on line 105 and the second parking brake controller 122 (second PBC) initiates a timer counter that may be embedded in the control logic 121, for example. The process then proceeds to block 208.

In block 208, a determination is made as to whether the first parking brake controller 112 is responding to the request signal on line 105 when the timer counter associated with control logic 121 is less than a predetermined count. If the determination in block 208 is affirmative (i.e., the first parking brake controller 112 is responding to the request signal when the timer counter is less than the predetermined count), the process proceeds to block 210 to indicate that no redundant parking brake action from the second parking brake controller 122 is needed. The process returns back to block 202 to continue monitoring for a request signal on line 105.

However, if the determination in block 208 is negative (i.e., the first parking brake controller 112 is not responding to the request signal on line 105 when the timer counter is less than the predetermined count), the process proceeds to block 212. In block 212, a determination is made as to whether the timer counter is greater than or equal to the predetermined count. If the determination in block 212 is negative (i.e., the timer counter is less than the predetermined count), the process returns back to block 208 to continue monitoring if the first parking brake controller 112 is responding to the request signal on line 105. However, if the determination in block 212 is affirmative (i.e., the timer counter is greater than or equal to the predetermined count), the process proceeds to block 214.

In block 214, the second parking brake controller 122 takes over parking brake control from the first parking brake controller 112. The process then proceeds to block 216 in which a determination is made as to whether conditions are correct to either park the vehicle or unpark the vehicle, depending upon whether the particular request signal on line 105 is to park or unpark the vehicle. The conditions in block 216 refer to the determinations made in blocks 202, block 208, and block 212.

If the determination in block 216 is affirmative (i.e., the conditions in blocks 202, 208, and 212 are correct), the process proceeds to block 218 in which the second parking brake controller 122 executes on the request signal on line 105 to apply the parking brakes. The second parking brake controller 122 also sends a message on line 128 to the alerting device 150 to alert a person in the passenger compartment of the vehicle that the request signal on line 105 has been honored. The process then ends.

However, if the determination in block 216 is negative (i.e., the conditions in blocks 202, 208, and 212 are not correct), the process proceeds to block 220 in which the second parking brake controller 122 does not execute on the request signal on line 105 to apply the parking brakes. The second parking brake controller 122 also sends a message to the alerting device 150 to alert a person in the passenger compartment of the vehicle that the request signal on line 105 has been rejected. The process then ends.

Although the above-description describes the conditions in blocks 202, 208, and 212 being determined if they are correct or not, it is contemplated that additional conditions may be determined if they are correct or not. In this case, the second parking brake controller 122 (i.e., the redundant controller) will only apply the parking brakes when the timer counter is expired and the additional conditions are met irrespective of whether the first parking brake controller 112 (i.e., the primary controller) is healthy or not. Accordingly, parking brakes are applied independently of whether or not the first parking brake controller 112 caused the parking brakes to be applied.

The additional conditions may be preconditions associated with the primary controller 112. The redundant controller 122 would check for correctness of those same preconditions associated with the primary controller 112. As examples, preconditions associated with the primary controller 112 may include correctness of speed, correctness of messages received, and correctness of other information received. Moreover, the redundant controller 122 must also check if faults are reported from the primary controller 112 when the redundant controller 122 is making decisions to either park or not park the vehicle.

It should be apparent that the primary controller 112 comprises an example of a means for, when a request signal to apply the parking brakes is received, applying the parking brakes. It should also be apparent that the redundant controller 122 comprises an example of a means for, when a predetermined count of the timer counter is reached, applying the parking brakes independently of whether or not the parking brakes have been applied in response to receiving the request signal on line 105 to apply the parking brakes.

Figure 3:
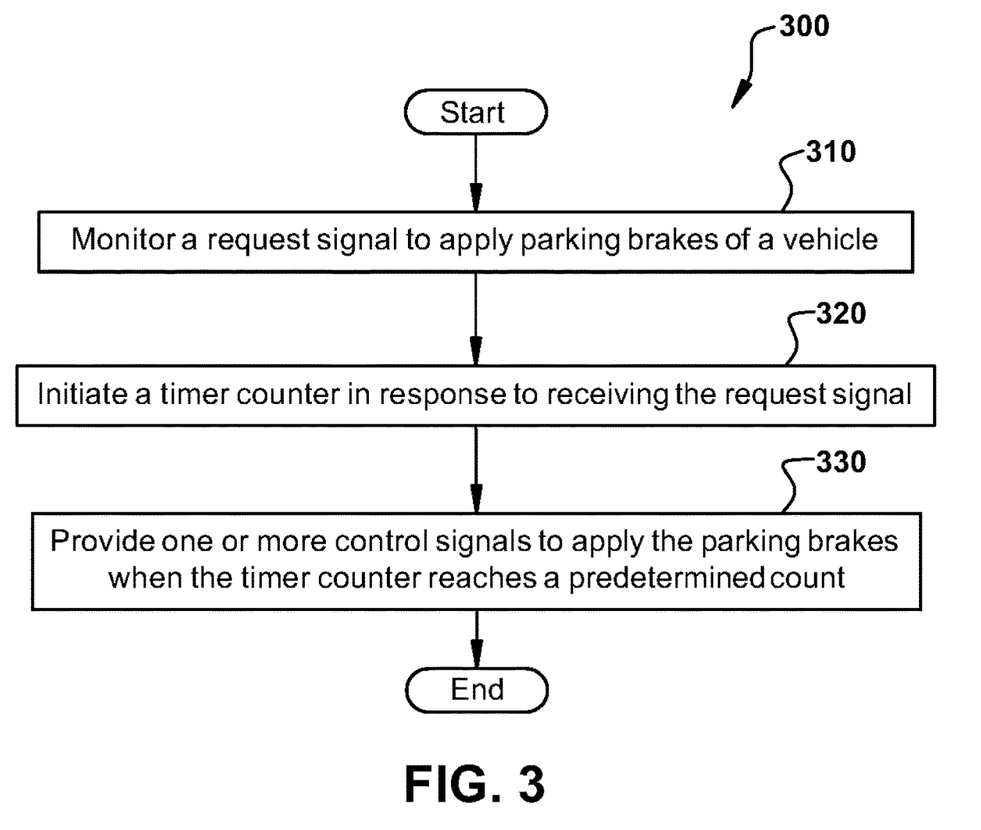
FIG. 3 is a flow diagram depicting an example method of operating the redundant parking brake apparatus of FIG. 1 in accordance with another embodiment.

Referring to FIG. 3, a flow diagram 300 depicts an example method of operating the redundant parking brake apparatus 100 of FIG. 1 in accordance with another embodiment.

In block 310, a request signal to apply parking brakes of a vehicle is monitored. The process proceeds to block 320 in which a timer counter is initiated in response to receiving the request signal. Then in block 330, one or more control signals are provided to apply the parking brakes when the timer counter reaches a predetermined. count. The process then ends.

In some embodiments, the predetermined count is between about one second and about five seconds.

In some embodiments, the method further comprises applying the parking brakes in response to receiving the request signal.

In some embodiments, the method is performed by a computer having a memory executing one or more programs of instructions which are tangibly embodied in a program storage medium readable by the computer.

A number of advantages result by providing a vehicle with the above-described redundant parking brake apparatus 100 of FIG. 1 to provide the redundant parking brake feature. One advantage is that the probability of failures in the overall parking brake system is reduced.

Another advantage is that safety is enhanced for the parking brake system of the vehicle.

Yet another advantage is that technological dependence of the parking brake system is improved when the first and second parking brake valves 114, 124 are of a different technology and operating method. The probability of the first and second parking brake valves 114, 124 failing for design or manufacturing issues is reduced.

Program instructions for enabling each of the first and second parking brake controllers 112, 122 to perform operation steps in accordance with corresponding flow diagrams 200, 300 (FIGS. 2 and 3, respectively) may be embedded in memory internal to the first and second parking brake controllers 112, 122. Alternatively, or in addition to, program instructions may be stored in memory external to the first and second parking brake controllers 112, 122. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of two parking brake controllers, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A redundant parking brake apparatus for a vehicle having components of a parking brake system, the redundant parking brake apparatus comprising:
   a first parking brake controller arranged to (i) monitor a first signal indicative of a request to apply parking brakes of the vehicle, and (ii) provide one or more control signals to be applied to components of the parking brake system to apply the parking brakes in response to receiving the first signal, wherein the first signal is received from a virtual driver controller of an autonomously-driven vehicle; and
   a second parking brake controller arranged to (i) initiate a timer counter in response to receiving the first signal, and (ii) provide one or more control signals to be applied to components of the parking brake system to apply the parking brakes when the timer counter has reached a predetermined count.

2. A redundant parking brake apparatus according to claim 1, wherein the predetermined count is between a count of about one second and about five seconds.

3. A redundant parking brake apparatus according to claim 1, wherein the second parking brake controller is further arranged to (iii) monitor a second signal indicative of whether the parking brakes of the vehicle are being applied in response to the first signal, and (iv) provide one or more control signals to be applied to components of the parking brake system to apply the parking brakes when the second signal indicates that the parking brakes are not being applied in response to the first signal.

4. A redundant parking brake apparatus according to claim 3, wherein the second signal is provided by a pressure sensor located in a brake line of the parking brake system.

5. A redundant parking brake apparatus according to claim 3, wherein the second signal is provided by an inter-controller signal from the first parking brake controller.

6. A redundant parking brake apparatus according to claim 5, wherein the first parking brake controller is further arranged to (iii) monitor a third signal indicative of whether the parking brakes of the vehicle are being applied in response to the first signal, and (iv) provide one or more control signals to be applied to components of the parking brake system to apply the parking brakes when the third signal indicates that the parking brakes are not being applied in response to the first signal.

7. A redundant parking brake apparatus according to claim 6, wherein the third signal is provided by a pressure sensor located within a parking brake valve of the parking brake system.

8. A redundant parking brake apparatus according to claim 1 further comprising:
   a first parking brake valve operatively coupled to the first parking brake controller; and
   a second parking brake valve operatively coupled to the second parking brake controller.

9. A redundant parking brake apparatus according to claim 8, wherein the first and second parking brake valves are arranged in a parallel configuration relative to spring brake chambers of the vehicle.

10. A redundant parking brake apparatus according to claim 8, wherein the first and second parking brake valves are arranged in a series configuration relative to spring brake chambers of the vehicle.

11. A redundant parking brake apparatus according to claim 8, wherein (i) the first parking brake valve and the first parking brake controller comprise at least a portion of a first electronic parking brake system, and (ii) the second parking brake valve and the second parking brake controller comprise at least a portion of a second electronic parking brake system.

12. A redundant parking brake apparatus according to claim 1 further comprising:
   an alerting device coupled to the first and second parking brake controllers and located in a passenger compartment of the vehicle.

13. A redundant parking brake apparatus for a vehicle having parking brakes and a timer counter, the redundant parking brake apparatus comprising:
   means for, when a request signal from a virtual driver controller of an autonomously-driven vehicle to apply the parking brakes is received, applying the parking brakes; and
   means for, when a predetermined count of the timer counter is reached, applying the parking brakes independently of whether or not the parking brakes have been applied in response to receiving the request signal to apply the parking brakes.

14. A redundant parking brake apparatus according to claim 13, wherein the predetermined count is between a count of about one second and about five seconds.

15. A redundant parking brake apparatus according to claim 13, wherein the request signal is received from a virtual driver controller of an autonomously-driven vehicle.

16. A method of operating a redundant parking brake apparatus for a vehicle, the method comprising:
   monitoring a request signal to apply parking brakes of the vehicle from a virtual driver controller of an autonomously-driven vehicle;
   initiating a timer counter in response to receiving the request signal; and
   providing one or more control signals to apply the parking brakes when the timer counter reaches a predetermined count.

17. A method according to claim 16, wherein the predetermined count is between about one second and about five seconds.

18. A method according to claim 16 further comprising:
   applying the parking brakes in response to receiving the request signal.

19. A method according to claim 16, wherein the method is performed by a computer having a memory executing one or more programs of instructions which are tangibly embodied in a program storage medium readable by the computer.

* * * * *